(12) United States Patent
Kangi

(10) Patent No.: US 10,996,124 B2
(45) Date of Patent: May 4, 2021

(54) HIGH ACCURACY PRESSURE TRANSDUCER WITH IMPROVED TEMPERATURE STABILITY

(71) Applicant: TUBITAK, Ankara (TR)

(72) Inventor: Rifat Kangi, Kocaeli (TR)

(73) Assignee: TUBITAK, Ankara (TR)

( * ) Notice: Subject to any disclaimer, the term of this patent is extended or adjusted under 35 U.S.C. 154(b) by 226 days.

(21) Appl. No.: 16/468,292

(22) PCT Filed: Dec. 21, 2017

(86) PCT No.: PCT/IB2017/058276
§ 371 (c)(1),
(2) Date: Jun. 11, 2019

(87) PCT Pub. No.: WO2018/122698
PCT Pub. Date: Jul. 5, 2018

(65) Prior Publication Data
US 2020/0080906 A1    Mar. 12, 2020

(30) Foreign Application Priority Data
Dec. 28, 2016   (TR) .................................. 2016/19943

(51) Int. Cl.
*G01L 19/04*    (2006.01)
*G01L 9/12*    (2006.01)
(Continued)

(52) U.S. Cl.
CPC .............. *G01L 5/161* (2013.01); *G01L 9/125* (2013.01); *G01L 19/0092* (2013.01)

(58) Field of Classification Search
CPC ......... G01L 9/025; G01L 9/045; G01L 9/065; G01L 9/085; G01L 9/105; G01L 9/125;
(Continued)

(56) References Cited

U.S. PATENT DOCUMENTS 5,452,614 A     9/1995  Kato et al.
5,625,152 A *   4/1997  Pandorf ................ G01L 9/0072
                                                73/756
(Continued)

FOREIGN PATENT DOCUMENTS

CN    202748187 U    2/2013
CN    106225962 A    12/2016

*Primary Examiner* — Herbert K Roberts
(74) *Attorney, Agent, or Firm* — Bayramoglu Law Offices LLC

(57) ABSTRACT

A high accuracy capacitive pressure transducer capable of performing measurements at a fixed temperature, with stability better than ±2 mK, in the temperature range of 15° C.-30° C. and which does not require the use of correction for thermal transpiration effect. The pressure transducer includes a vacuum gauge having a pressure sensor and a pressure sensor sheath, a temperature control unit secured in a cap; an aluminum block having a lower surface in contact with the pressure sensor sheath and an upper surface in contact with a main plate; and a temperature sensor located between the main plate and the upper surface of the aluminum block. The vacuum gauge is connected to a vacuum system by means of a connecting pipe.

5 Claims, 3 Drawing Sheets

(51) Int. Cl.
*G01L 5/161* (2020.01)
*G01L 19/00* (2006.01)

(58) Field of Classification Search
CPC ............... G01L 19/0092; G01L 19/04; G01L 2019/0053
See application file for complete search history.

(56) References Cited

U.S. PATENT DOCUMENTS

| | | | | |
|---|---|---|---|---|
| 6,029,525 | A * | 2/2000 | Grudzien | G01L 9/0072 73/718 |
| 7,000,479 | B1 * | 2/2006 | Poulin | G01L 19/04 73/708 |
| 7,124,640 | B1 * | 10/2006 | Miller | G01L 19/04 73/708 |
| 2002/0083774 | A1 * | 7/2002 | Poulin | G01L 19/14 73/708 |
| 2003/0233883 | A1 * | 12/2003 | Mei | G01L 19/0636 73/718 |
| 2006/0070447 | A1 * | 4/2006 | Agami | G01L 19/04 73/708 |
| 2009/0114029 | A1 * | 5/2009 | Ide | G01L 9/0072 73/724 |
| 2010/0186516 | A1 * | 7/2010 | Hanselmann | G01L 19/04 73/718 |
| 2012/0031190 | A1 | 2/2012 | Blankenship | |

* cited by examiner

HIGH ACCURACY PRESSURE TRANSDUCER WITH IMPROVED TEMPERATURE STABILITY

CROSS REFERENCE TO THE RELATED APPLICATIONS

This application is the national phase entry of International Application No. PCT/IB2017/058276, filed on Dec. 21, 2017, which is based upon and claims priority to Turkish Patent Application No. TR2016/19943, filed on Dec. 28, 2016, the entire contents of which are incorporated herein by reference.

TECHNICAL FIELD

The invention relates to a pressure transducer that is placed inside the temperature control box.

The invention more particularly relates to a high accuracy capacitive pressure transducer with improved thermal properties capable of performing measurements at the fixed temperature, with stability better than ±2 mK, in the temperature range of 15° C.-30° C., which does not require the use of correction for thermal transpiration effect.

BACKGROUND

Pressure transducers are typically considered as pressure sensors at low and intermediate vacuum pressure ranges. One of these transducers is the capacitance manometer with high accuracy that performs precise and accurate pressure measurements of the gases. These devices are principally used as the reference standard in international primary and second level calibration systems. The use of capacitance manometers in vacuum applications has been gaining popularity worldwide, and they are not only transfer standards used in metrology and having high accuracy, but they are also actively used as vacuum measuring instruments during industrial processes where needed.

As the vacuum gauge is sensitive against external temperature factors, it can be controlled under 45° C. When the ambient temperature is different from this temperature, the pressure may be measured differently due to the thermal transpiration effect. The mathematical approaches employed for determining the actual pressure value of the device have certain errors. One of the ways to overcome such errors is to operate the gauge sensor at stable room temperature. In this case, however, the temperature of the sensor is about 3° C. higher than room temperature due to the heat dissipated by the electronic circuits of the gauge.

The U.S. Patent Application Numbered US2012031190 filed on 1 Feb. 2011 within the state of the art discloses a capacitive pressure sensor, and more particularly an improved sensor that performs highly precise and precise measurements especially at very low pressures. It has a diaphragm comprising a common electrode, a center electrode and a ring electrode.

The fact that there exists no pressure transducer in the state of the art which allows for reliable measurements without requiring pressure correction has deemed it necessary to develop a pressure transducer with high accuracy according to the invention.

SUMMARY

The object of the present invention is to provide a high accuracy capacitive pressure transducer with improved thermal properties capable to perform measurements at fixed temperature, with stability that is better than ±2 mK, in the temperature range of 15° C.-30° C., which does not require the use of correction for thermal transpiration effect.

Another object of the invention is to provide a pressure transducer comprising a vacuum gauge that allows more accurate measurements by making the temperature of the pressure sensor equal to the ambient temperature.

Still another object of the invention is to provide a pressure transducer in which the temperature control unit comprises an aluminum block in order that the gauge will remain unaffected by the heat dissipated by the electronic circuits.

Another object of the invention is to provide a pressure transducer comprising a vacuum gauge whereby more reliable measurements are made without pressure correction, by eliminating the thermal transpiration effect.

The pressure (vacuum) gauge disclosed herein is positioned in a specially designed temperature-controlled box. The upper cap of the gauge is demounted and the upper surface of the sensor sheath directly (metal-metal) contacts with the surface of a box having a temperature control unit. The temperature-controlled unit is controlled by an independent and stable temperature controller. With the invention, the temperatures of the connecting pipe of the sensor and vacuum gauge can be readily adjusted and the vacuum gauge may be operated at the desired temperature range. In case the temperature of the pressure sensor is the same as the ambient temperature, the gauge which is in use measures the pressure more accurately. Due to the absence of the thermal transpiration effect in this case, no pressure correction as to the temperature difference is needed and the measurements become more reliable and simple.

BRIEF DESCRIPTION OF THE DRAWINGS

The high accuracy capacitive pressure transducer with improved temperature stability which has been developed in order to achieve the objects of the invention has been shown in the accompanying drawings, in which.

The parts shown in the drawings are enumerated individually and the corresponding reference numerals thereto are given below.

Figure 1:
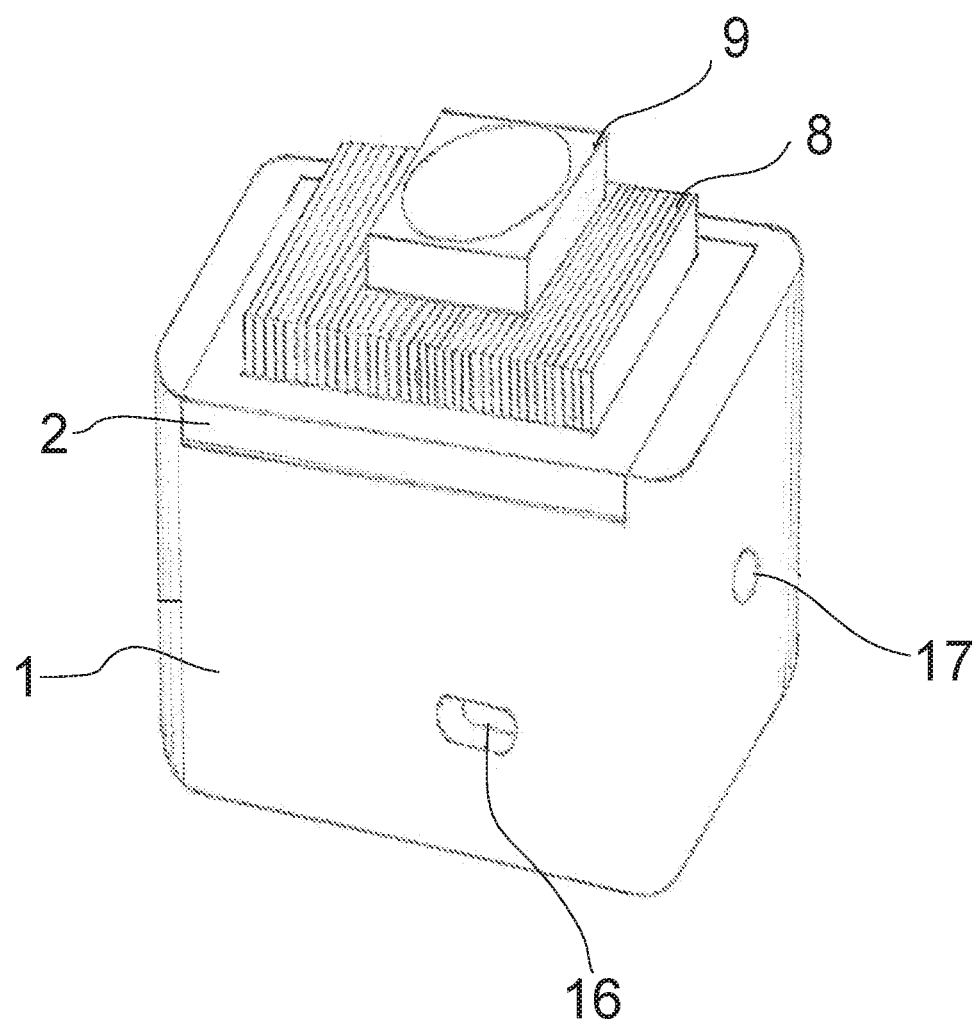
FIG. 1 is the perspective view of the temperature-controlled box in which the pressure transducer according to the invention is positioned.
Figure 2:
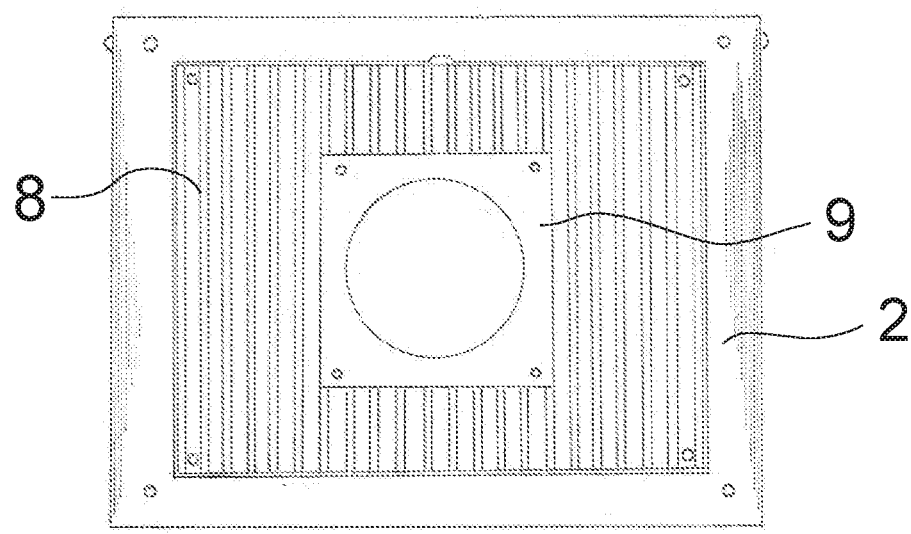
FIG. 2 is the top view of the temperature-controlled box in which the pressure transducer according to the invention is positioned.
Figure 3:
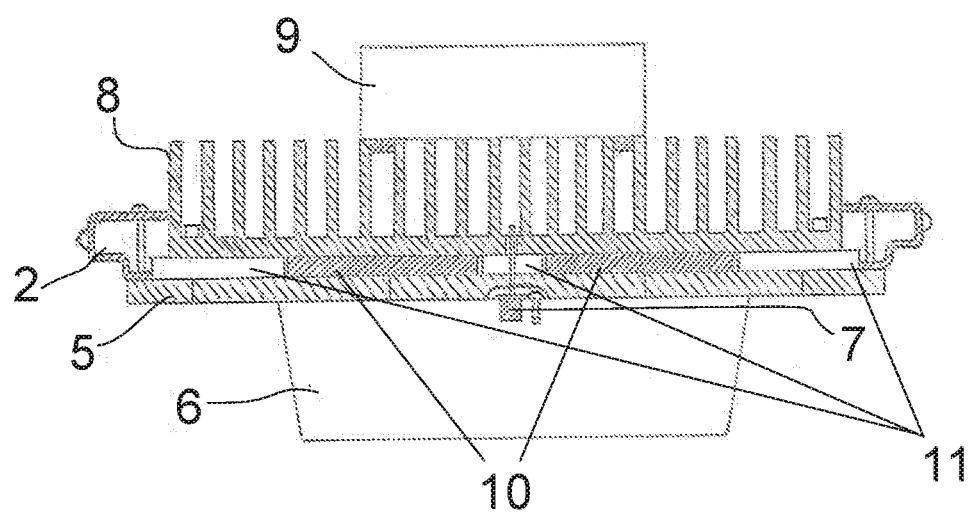
FIG. 3 is the side perspective view of the temperature control unit.
Figure 4:
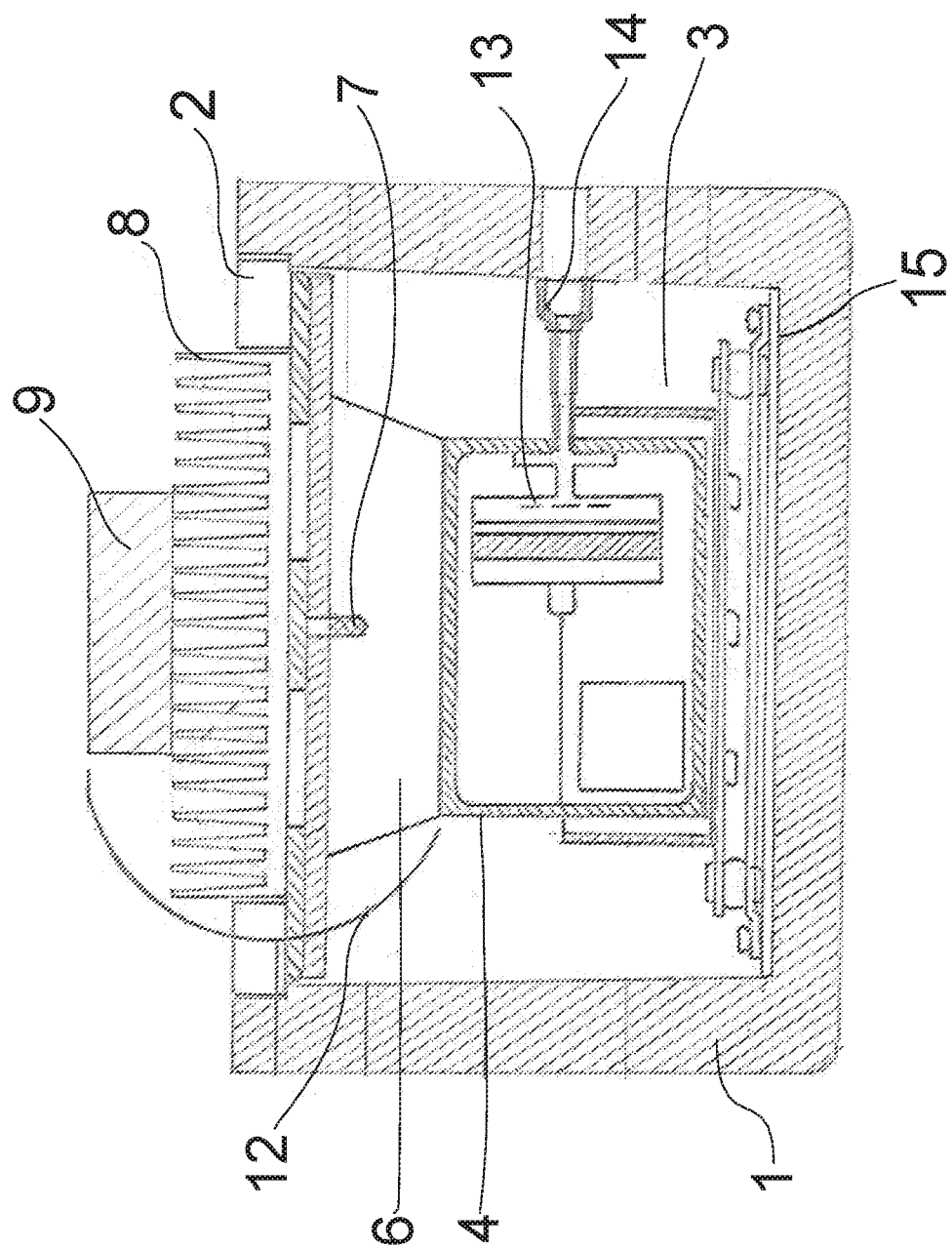
FIG. 4 is the side cross-sectional view of the pressure transducer according to the invention and the temperature-controlled box.

1. Temperature-controlled box
2. Cap
3. Vacuum gauge
4. Pressure sensor sheath
5. Main plate
6. Aluminum block
7. Temperature sensor
8. Heat receptor
9. Air cooler
10. Thermoelectric modules
11. Heat insulators
12. Temperature control unit 13. Pressure sensor
14. Connecting pipe
15. Bottom plate
16. Cable input
17. Vacuum gauge connection input

DETAILED DESCRIPTION OF THE EMBODIMENTS

The pressure transducer according to the invention comprises:
- a vacuum gauge (3) which is secured in the bottom plate (15) disposed in the temperature-controlled box (1), which has a pressure sensor (13) and a pressure sensor sheath (4), and which is connected to the vacuum system by means of the connecting pipe (14),
- an aluminum block (6) which is located such that one surface thereof will contact with the pressure sensor sheath (4) and the other surface with the main plate (5),
- a temperature sensor (7) located between the main plate (5) and the upper surface of the aluminum block (6),
- a temperature control unit (12) comprising a heat receptor (8) secured in the cap (2), an air cooler (9) positioned on the heat receptor (8), thermoelectric modules (10) disposed under the heat receptor (8) and between the heat insulators (11), a main plate (5) provided below the thermoelectric modules (10) and the heat insulators (11), an aluminum block (6) in contact with the main plate (5), and a temperature sensor (7) positioned between the main plate (5) and the aluminum block (6),
- a cable input (16) which is arranged on the outer surface of the temperature-controlled box (1) and used for providing the electrical connection of the vacuum gauge (3) with the measurement instrument, and
- a vacuum gauge connection input (17) which is arranged on the outer surface of the temperature-controlled box (1) and used for pressure connection of the vacuum gauge (3) to the vacuum system.

With the invention, the temperature of the pressure sensor (13) is made equal to the ambient temperature by means of the temperature control unit (12), thereby increasing the stability and accuracy of the device.

The temperature control unit (12) is mounted in the cap (2) of the temperature-controlled box (1). The temperature control unit (12) comprises a heat receptor (8) secured in the cap (2), an air cooler (9) positioned on the heat receptor (8), thermoelectric modules (10) disposed under the heat receptor (8) and between heat insulators (11), a main plate (5) provided below the thermoelectric modules (10) and the heat insulators (11), an aluminum block (6) in contact with the main plate (5), and a temperature sensor (7) positioned between the main plate (5) and the aluminum block (6).

The aluminum block (6) surfaces that are in contact with the main plate (5) may be coated with a thermally conductive material, e.g. grease, so as to improve the thermal conductivity there-between. The same is applicable to the aluminum block (6), main plate (5), thermoelectric modules (10) and heat receptor (8) contact surfaces. Heat insulators (11) are used in order to prevent the heat loss between the main plate (5) surface and the heat receptor (8) disposed thereon. Ceramic fiber can be preferred as heat insulators (11) due to the low thermal conductivity thereof.

The vacuum gauge (3) used herein is secured in the bottom plate (15) disposed in the temperature-controlled box (1). The upper surface of the pressure sensor sheath (4) is in direct (metal-metal) contact with the surface of the aluminum block (6) located in the temperature control unit (12). As a result of this, the heat tried to be dissipated by the electronic circuits of the vacuum gauge (3) onto the pressure sensor (13) is neutralized.

A number of measurements at +15° C. to +30° C. temperature range have been performed with a view to determine the temperature stability of the pressure sensor (13) at varying room temperatures. During these trials, the same vacuum gauge (3) is located in a temperature-controlled box (1) having a temperature control unit (12).

When the upper surface of the pressure sensor sheath (4) is in direct (metal with metal) contact with the surface of the aluminum block (6) located in the temperature control unit (12), the temperature value is set to +15° C. to +30° C. temperature range on the temperature controller and the temperature values are measured against time. After about 5.5 hours, the pressure sensor (13) temperature is controlled under the set temperature at ±2 mK stability. These trials have shown that the pressure sensor (13) temperature can be controlled at ±2 mK stability independent of the ambient temperature, at +15° C. to +30° C. temperature range.

Further, it was observed that temperature did not vary during the experiments when the temperature control unit (12) developed with the invention is used on the connecting pipe (14) of the vacuum gauge (3).

With the invention, the temperatures of the connecting pipe (14) of the pressure sensor (13) and vacuum gauge (3) can be readily adjusted and they may be operated at the desired temperature range. The vacuum gauge (3) used herein measures the pressure more accurately owing to the fact that the pressure sensor (13) temperature is the same as the temperature of the environment being measured and very stable.

The invention claimed is:

1. A pressure transducer comprising:
    a vacuum gauge having a pressure sensor and a pressure sensor sheath, wherein, the vacuum gauge is connected to a vacuum system by means of a connecting pipe;
    a temperature control unit secured in a cap;
    an aluminum block having a lower surface in contact with the pressure sensor sheath and an upper surface in contact with a main plate; and
    a temperature sensor located between the main plate and the upper surface of the aluminum block.

2. The pressure transducer according to claim 1, wherein, the temperature control unit comprises a heat receptor secured in the cap, an air cooler positioned on the heat receptor, a plurality of thermoelectric modules disposed under the heat receptor and between the heat insulators, the main plate provided below the plurality of thermoelectric modules and the heat insulators, the aluminum block in contact with the main plate, and the temperature sensor positioned between the main plate and the aluminum block.

3. The pressure transducer according to claim 1, further comprising a bottom plate, the vacuum gauge disposed in a temperature-controlled box is mounted on the bottom plate.

4. The pressure transducer according to claim 2, further comprising a grease layer for improving thermal conductivity between components disposed in the temperature control unit.

5. The pressure transducer according to claim 2, wherein, the heat insulators are made of ceramic fiber.

* * * * *